UNITED STATES PATENT OFFICE.

JULIUS AUGUSTUS ROTH, OF PHILADELPHIA, PENNSYLVANIA, ASSIGNOR TO JAMES B. BROWN, OF PEEKSKILL, NEW YORK.

IMPROVEMENT IN THE MANUFACTURE OF PAPER-PULP.

Specification forming part of Letters Patent No. 49,480, dated August 15, 1865.

*To all whom it may concern:*

Be it known that I, JULIUS AUGUSTUS ROTH, of Philadelphia, in the county of Philadelphia and State of Pennsylvania, have invented a new and useful Improvement in the Manufacture of Paper-Pulp; and I do hereby declare that the following is a full, clear, and exact description thereof, which will enable others skilled in the art to fully understand and make use of the same.

This invention consists in treating fibrous materials—such as wood-fiber, hemp, Manila grass, and other similar fibers—after the same have been reduced in small particles, with chlorine gas in a dry state and under continuous agitation, in such a manner that a pulp is obtained which will readily absorb water, and which can be worked into paper either alone or mixed with ordinary paper-pulp.

The wood, hemp, or other material to be reduced into paper-pulp is first cut up or ground or otherwise reduced into small pieces by any of the well-known methods, and then I place the same into an agitator for the purpose of treating it with chlorine gas.

The agitator consists of a closed vessel with suitable stirrers, and the chlorine gas is applied perfectly dry. By the action of this gas the fibers are divested from their adhering impurities, and they preserve the requisite affinity for water and the quality to form in water a fine even paste. By treating these fibers with alkalies, as is usually done, some portions of the same are rendered insoluble in water, and the fibers are coated with a gummy substance, which has to be removed by treating the same in costly boilers, with much loss in time and labor. I treat the fiber with chlorine gas until the pulp assumes an orange color, when it is considered ready for the paper-manufacturers. The pulp improves if it is confined for some time with the acids formed by the action of the chlorine gas, and when the pulp thus prepared reacues the paper-mill it is soaked in water and treated by any of the well-known processes.

I claim as new and desire to secure by Letters Patent—

Treating fibrous materials such as herein specified, after the same have been reduced into small particles, with chlorine gas in a dry state and under continuous agitation, produced by means substantially such as above described, or any other equivalent means, for the purposes set forth.

JULIUS AUGUST. ROTH.

Witnesses:
M. M. LIVINGSTON,
W. HAUFF.